United States Patent
Liphardt et al.

(10) Patent No.: US 10,612,976 B1
(45) Date of Patent: Apr. 7, 2020

(54) SYSTEMS AND METHODS FOR PRODUCING A MORE UNIFORM INTENSITY WAVELENGTH DISPERSED BEAM OF ELECTROMAGNETIC RADIATION ENTERING A MULTI-ELEMENT DETECTOR, WHILE MAINTAINING INFORMATION CONTENT THEREIN

(71) Applicant: J.A. WOOLLAM CO., INC, Lincoln, NE (US)

(72) Inventors: Martin M. Liphardt, Lincoln, NE (US); Ping He, Lincoln, NE (US)

(73) Assignee: J.A. WOOLLAN CO., INC., Lincoln, NE (US)

( * ) Notice: Subject to any disclaimer, the term of this patent is extended or adjusted under 35 U.S.C. 154(b) by 85 days.

(21) Appl. No.: 15/330,370

(22) Filed: Sep. 13, 2016

Related U.S. Application Data

(60) Provisional application No. 62/284,696, filed on Oct. 6, 2015.

(51) Int. Cl.
   *G01J 3/42* (2006.01)
   *G01J 3/28* (2006.01)
(52) U.S. Cl.
   CPC ............. *G01J 3/42* (2013.01); *G01J 3/2803* (2013.01); *G01J 2003/425* (2013.01)
(58) Field of Classification Search
   CPC .......................................................... G01J 3/42
   USPC ......................................................... 356/326
   See application file for complete search history.

(56) References Cited

U.S. PATENT DOCUMENTS

| | | | | |
|---|---|---|---|---|
| 4,822,998 A | * | 4/1989 | Yokota | G01J 3/26 250/226 |
| 5,726,771 A | * | 3/1998 | Gann | H04N 1/4072 358/445 |
| 5,930,410 A | * | 7/1999 | Webb | H04N 1/6011 382/312 |
| 7,433,034 B1 | * | 10/2008 | Huang | G01N 21/94 356/237.5 |
| 7,911,517 B1 | * | 3/2011 | Hunt, Jr. | G06K 9/0063 348/272 |
| 8,351,031 B2 | | 1/2013 | Liphardt | |
| 8,749,785 B2 | | 6/2014 | Liphardt | |
| 2001/0028400 A1 | * | 10/2001 | Lee | G02B 5/201 348/273 |
| 2003/0179379 A1 | * | 9/2003 | Gedig | G01N 21/553 356/445 |
| 2004/0165187 A1 | * | 8/2004 | Koo | G01N 21/65 356/445 |
| 2005/0258335 A1 | * | 11/2005 | Oshiro | G02B 21/244 250/201.3 |

(Continued)

*Primary Examiner* — Kara E. Geisel
*Assistant Examiner* — Omar H Nixon
(74) *Attorney, Agent, or Firm* — James D. Welch

(57) ABSTRACT

Methods and systems that utilize 1) electromagnetic radiation energy absorbing or reflecting material of spatially distributed different optical densities and 2) wavelength dependent electromagnetic radiation energy aperturing, or both, placed near the entry to said multi-element detector, to improve detector capability to monitor intensity vs. wavelength spectra entered thereinto and provide more uniform detector output, while preferably maintaining beam angle and plane of incidence.

1 Claim, 2 Drawing Sheets

(56) References Cited

U.S. PATENT DOCUMENTS

| | | | | |
|---|---|---|---|---|
| 2006/0022917 A1* | 2/2006 | Kim | .................. | G09G 3/30 345/83 |
| 2006/0164657 A1* | 7/2006 | Chalmers | .......... | G01B 11/0625 356/630 |
| 2006/0170920 A1* | 8/2006 | Granger | .................. | G01J 3/12 356/328 |
| 2008/0285035 A1* | 11/2008 | Liphardt | .................. | G01J 1/04 356/369 |
| 2009/0035179 A1* | 2/2009 | Rakow | .................. | G01N 21/78 422/400 |
| 2010/0267163 A1* | 10/2010 | Ran | .................. | G01N 21/553 436/164 |
| 2010/0328681 A1* | 12/2010 | Kapner | ............. | G01D 5/34715 356/616 |
| 2011/0174977 A1* | 7/2011 | Hikmet | .................. | G01J 3/02 250/331 |
| 2013/0063624 A1* | 3/2013 | Lin | .................. | H04N 9/045 348/231.99 |
| 2014/0176729 A1* | 6/2014 | Saari | .................. | G01J 3/45 348/182 |
| 2014/0267878 A1* | 9/2014 | Geelen | .................. | G01J 3/513 348/342 |
| 2014/0294250 A1* | 10/2014 | Aoki | .................. | G06F 21/32 382/115 |
| 2015/0029497 A1* | 1/2015 | Anikitchev | .......... | G01J 1/0407 356/236 |
| 2016/0047690 A1* | 2/2016 | Yun | .................. | G01J 1/0492 250/206 |
| 2016/0223732 A1* | 8/2016 | Jeon | ................ | G02F 1/133609 |

\* cited by examiner

US 10,612,976 B1

SYSTEMS AND METHODS FOR PRODUCING A MORE UNIFORM INTENSITY WAVELENGTH DISPERSED BEAM OF ELECTROMAGNETIC RADIATION ENTERING A MULTI-ELEMENT DETECTOR, WHILE MAINTAINING INFORMATION CONTENT THEREIN

This Application Claims Benefit from Provisional Application No. 62/284,696 Filed Oct. 6, 2015.

TECHNICAL AREA

The present invention relates to methods of providing a more uniform intensity spectroscopic beam of electromagnetic radiation over a spectrum of wavelengths which is entered into a multi-element detector, so that said detector's output is more uniform, while also maintaining average angle-of-incidence and therefore information content at each wavelength, and more particularly to methods and systems that utilize:
1) electromagnetic radiation energy absorbing or reflecting material with spatially varying optical densities; and
2) electromagnetic radiation energy blocking, wavelength dependent aperturing;
placed near the entry to said multi-element detector.

BACKGROUND

A common problem when applying available sources of spectroscopic electromagnetic radiation in, for instance, Reflectometers, Spectrophotometers, Ellipsometers and Polarimeters is that the intensity spectrum of a range of wavelengths output thereby is typically not uniform. This can be at least partially the result of interaction with a wavelength dispersion element, as well as the inherent properties of a source of electromagnetic radiation. There usually will be at least one peak intensity region, with valley intensity regions surrounding. It occurs that the peak intensity can saturate a detector, which monitors entering electromagnetic based on electromagnetic radiation source and investigated sample characteristics. If the peak intensity can be attenuated, (ie. absorbed or reflected), or apertured, (ie. blocked in regions and transmitted in others), so that a more uniform intensity profile is realized, then it is possible that relatively low intensity wavelengths can be increased in intensity, without also causing the high intensity wavelengths to saturate a monitoring detector.

Known Patents which might be considered relevant are U.S. Pat. Nos. 8,351,036 and 8,749,785 to Liphardt.

Need exists for systems and methods of controlling intensity vs. wavelength profiles of electromagnetic beam radiation.

DISCLOSURE OF THE INVENTION

Spectroscopic beams of electromagnetic radiation from a source thereof are known to vary in intensity with wavelength. The present invention comprises systems and methods for providing a spectroscopic beam of electromagnetic radiation of an improved intensity uniformity, to a multi-element detector in which different wavelengths enter different detector elements, so that said detector's output is more uniform over a spectrum of wavelengths.

In one embodiment of the present invention, two effects are simultaneously applied to provide said more uniform intensity spectroscopic beam of electromagnetic radiation over a spectrum of wavelengths, while maintaining average angle-of-incidence and therefore information content at each wavelengths. In this embodiment, the system comprises:
 a multi-element detector of electromagnetic radiation;
  a') an electromagnetic radiation energy absorbing or reflecting material of spatially varying optical densities, which is designed to attenuate high intensity wavelengths more than low intensity wavelengths near the entry to said detector so that at least one wavelength of relatively higher intensity is more attenuated than is a relatively lower intensity wavelength, and is therefore reduced in intensity more than is the relatively lower intensity wavelength; and
  b') a wavelength dependent electromagnetic radiation energy blocking aperture which is designed to attenuate high intensity wavelengths more than low intensity wavelengths near the entry to said multi-element detector, so that at least one wavelength of relatively higher intensity is subjected to greater aperturing, and thus a smaller area through which to pass, than is a relatively lower intensity wavelength and is therefore reduced in intensity more than is the relatively lower intensity wavelength.

(Note: an aperture is considered to be a system that either allows, or blocks electromagnetic radiation energy irrespective of wavelength, but rather depending on where that energy is spatially presented to the aperture. Attenuation in a aperture is therefore best viewed as energy "blocking". A typical aperture will allow energy to pass centrally, but symmetrically completely block energy beyond that central location in at least a vertical direction, (see FIG. 2b), and possibly in a lateral direction as well. Many sources of electromagnetic radiation provide higher intensities centrally in a range of wavelengths, and a FIG. 2b approach to aperturing can be applied to smooth the intensity of the spectrum. FIG. 2b is not limiting however. if a spectrum of wavelengths demonstrates higher intensities laterally, the effective aperture would be designed to provide greater aperturing laterally).

The present invention assumes that different wavelengths are diffracted and spatially distributed so that they enter different elements of the multi-element detector. In that light, the just described system is distinguished in that, during use, at least one wavelength of relatively higher intensity is more attenuated and/or more apertured, (eg. blocked), than is at least one relatively lower intensity wavelength, and is therefore reduced in intensity more than is the relatively lower intensity wavelength. Symmetrically applied Aperturing also can further provide that an information preserving average Angle-of-Incidence, (see FIG. 5), of energy entering a detector can also be maintained for all wavelengths involved. If symmetrical aperturing is not applied, the effective Angle-of-Incidence will be shifted). It is also noted that varying, (as viewed in frontal elevation), electromagnetic radiation energy absorbing or reflecting material of spatially varying optical densities as in a') above, can operate as an effective and even "graded" aperture. That is, the electromagnetic radiation energy absorbing or reflecting material provides spatial variation in optical densities in vertical as well as lateral directions, as the multi-element detector is viewed in frontal elevation. This approach is within the scope of present invention and Claims should be interpreted to include it. As such a system is difficult to manufacture, however, for the purposes of this disclosure, it is noted that aperturing is more conveniently achieved by applying electromagnetic radiation "blocking" material as described in b') above.

A method of providing a more uniform intensity spectroscopic beam of electromagnetic radiation over a spectrum of wavelengths to a multi-element detector, and a more uniform detector output as a function of wavelength, while maintaining average angle-of-incidence and therefore information content entered into a multi-element detector at various wavelengths, comprises the steps of:
   a) providing a system as just disclosed;
   b) determining the pattern of beam intensity vs. wavelength;
   c) placing an electromagnetic radiation energy absorbing or reflecting material of spatially varying optical densities, which is designed to attenuate high intensity wavelengths more than low intensity wavelengths as determined in step b), near the entry to said detector so that at least one wavelength of relatively higher intensity is more attenuated than is a relatively lower intensity wavelength, and is therefore reduced in intensity more than is the relatively lower intensity wavelength; and
   placing a wavelength dependent electromagnetic radiation energy blocking aperture, which is designed to attenuate high intensity wavelengths more than low intensity wavelengths as determined in step b), near the entry to said multi-element detector, so that at least one wavelength of relatively higher intensity is subjected to greater aperturing, and thus a smaller area through which to pass, than is a relatively lower intensity wavelength and is therefore reduced in intensity more than is the relatively lower intensity wavelength.

Said method is distinguished in that at least one wavelength of relatively higher intensity as determined in step b) is more attenuated and/or apertured than is at least one relatively lower intensity wavelength, and is therefore reduced in intensity more than is the relatively lower intensity wavelength and so preferably, an average angle-of-incidence is maintained. The result being a more uniform intensity beam of electromagnetic radiation entering said multi-element detector and more uniform detector output, as a function of wavelength.

A modified system comprises a multi-element detector of electromagnetic radiation positioned to receive a spectroscopic beam of electromagnetic radiation which is spatially dispersed and directed theretoward as a spectrum of wavelengths that enter different elements of said multi-element detector, said beam being characterized by different intensities at at least two different wavelengths, said multi-element detector having electromagnetic radiation energy absorbing or reflecting material of different spatially varying optical densities near the entry thereto, so that at least one wavelength of relatively higher intensity is more attenuated than is a relatively lower intensity wavelength, and is therefore reduced in intensity more than is the relatively lower intensity wavelength by interaction therewith. The result is a more uniform intensity beam of electromagnetic radiation entering said multi-element detector elements, and more uniform detector output, as a function of wavelength. This embodiment does not include aperturing material.

A method of providing a more uniform intensity spectroscopic beam of electromagnetic radiation over a spectrum of wavelengths, which beam is entered into a multi-element detector so said detector provides a more uniform wavelength dependent output signal, while optionally maintaining average angle-of-incidence and therefore information content, which is entered into a multi-element detector at each wavelength, comprising the steps of:
   a) providing a system as just described;
   b) determining the pattern of beam intensity vs. wavelength;
   c) placing an electromagnetic radiation energy absorbing or reflecting material of spatially varying optical densities, which is designed to attenuate high intensity wavelengths more than low intensity wavelengths as determined in step b), near the input of said detector so that at least one wavelength of relatively higher intensity is more attenuated than is a relatively lower intensity wavelength, and is therefore reduced in intensity more than is the relatively lower intensity wavelength.

The result is a more uniform intensity beam of electromagnetic radiation entering said multi-element detector, and a more uniform signal exiting said detector, as a function of wavelength, based on application of electromagnetic radiation energy absorbing or reflecting material.

Said method can provide that the spatially varying optical density is a function of material thickness.

Said method can provide that the placing of electromagnetic radiation energy absorbing or reflecting material of spatially varying different optical densities near the entry to said multi-element detector, is effected by deposition of said energy absorbing or reflecting material on said multi-element detector.

Said method can be made equivalent to the first embodiment method by providing that said multi-element detector further has electromagnetic radiation energy blocking material near the entry thereto, positioned symmetrically at both upper and lower locations, as viewed in frontal elevation, so that the average angle-of-incidence beam components continue to reach said detector elements, and therefore information content is maintained.

A modified present invention multi-element detector of electromagnetic radiation positioned to receive a spectroscopic beam of electromagnetic radiation which is spatially dispersed and directed theretoward as a spectrum of wavelengths that enter different elements of said multi-element detector, said beam being characterized by different intensities at at least two different wavelengths, said multi-element detector being characterized by a wavelength dependent electromagnetic radiation energy blocking aperture near the entry thereto, so that at least one wavelength of relatively higher intensity is provided a smaller effective aperture area through which to pass than is a relatively lower intensity wavelength, and is therefore reduced in intensity more than is the relatively lower intensity wavelength. The result is a more uniform intensity beam of electromagnetic radiation entering said multi-element detector and a more uniform detector output, as a function of wavelength. Said multi-element detector being distinguished in that it has said wavelength dependent electromagnetic radiation energy blocking aperture near the entry thereto positioned symmetrically at both upper and lower locations, as viewed in frontal elevation, so that the average angle-of-incidence beam components continue to reach said detector elements, and therefore information content is maintained.

A method of providing a more uniform intensity spectroscopic beam of electromagnetic radiation to a detector thereof, as well as more uniform detector output over a spectrum of wavelengths, while maintaining average angle-of-incidence, and therefore information content which is entered into a multi-element detector at each wavelength, comprising the steps of:

a) providing a system as just described;
b) determining the pattern of beam intensity vs. wavelength;
c) providing a wavelength dependent electromagnetic radiation energy blocking aperture which is designed to attenuate high intensity wavelengths more than low intensity wavelengths as determined in step b), near the entry to said multi-element detector, so that at least one wavelength of relatively higher intensity is subjected to greater aperturing, and thus a smaller area through which to pass, than is a relatively lower intensity wavelength and is therefore reduced in intensity more than is the relatively lower intensity wavelength.

The result is a more uniform intensity beam of electromagnetic radiation entering said multi-element detector and a more uniform detector output, as a function of wavelength. Said method is distinguished in that said multi-element detector applies said wavelength dependent electromagnetic radiation energy blocking aperturing near the entry thereto positioned symmetrically at both upper and lower locations, as viewed in frontal elevation, so that the average angle-of-incidence beam components continue to reach said detector elements, and therefore information content is maintained.

Said method preferably provides that the wavelength dependent electromagnetic radiation energy blocking aperturing near the entry to said multi-element detector comprises a material that reacts to different wavelengths essentially the same.

Said method can involve the aperture comprises material deposited directly onto the entry of said detector.

In any of said systems or methods, it is noted that
  said multi-element detector can be further distinguished in that it has said wavelength dependent electromagnetic radiation energy blocking aperture near the entry thereto positioned symmetrically at both left and right locations, as viewed in frontal elevation; and/or
  said multi-element detector can be further distinguished in it has electromagnetic radiation energy absorbing or reflecting material of spatially varying optical densities near the entry thereto, positioned symmetrically at both left and right locations, as viewed in frontal elevation.
The average plane-of-incidence beam components are then caused to continue to reach said detector elements.

It is noted that, in all systems and method, a suitable detector type is a Charge Coupled Device (CCD).

The present invention will be better understood by reference to the Detailed Description Section of this Specification, in conjunction with the Drawings.

DETAILED DESCRIPTION

Figure 1A:
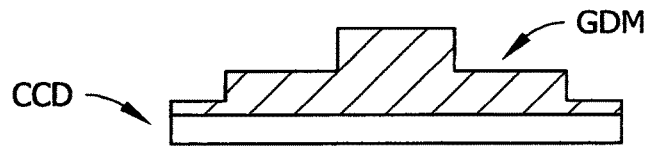
FIG. 1a shows a first approach Charge Coupled Device (CCD) in side elevation.
Figure 1B:
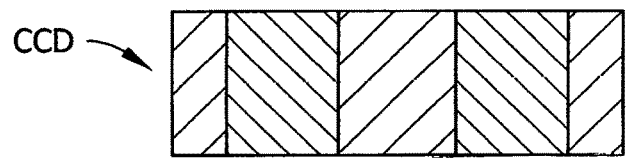
FIG. 1b shows a first approach Charge Coupled Device (CCD) in frontal elevation.

Turning now to the Drawings, FIGS. 1a and 1b show a first approach Charge Coupled Device (CCD) in side and frontal elevation. Note that atop a CCD there is present varying depths of wavelength absorbing or reflecting Optically Dense (ODM) material which provide greater optical density in wavelength regions where wavelength intensity is greatest. (See FIG. 3)

Figure 2A:
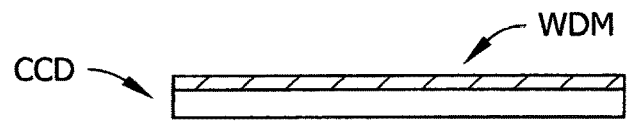
FIG. 2a shows a second approach Charge Coupled Device (CCD) in side elevation.
Figure 2B:
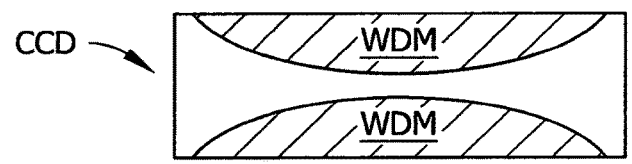
FIG. 2b shows another second approach Charge Coupled Device (CCD) in frontal elevation.

FIGS. 2a and 2b show a second approach Charge Coupled Device (CCD) in side and frontal elevation. Note in FIG. 2a that the Material (WDM) is not of different depths over the area of the CCD, but rather provides an electromagnetic radiation energy aperture blocking effect on a wavelength determined basis, as demonstrated in FIG. 2b. This does not exclude differing depths of Wavelength Dependent Material (WDM) at various locations on the surface of a CCD, but only serves to indicate such is not necessary.

Figure 3:
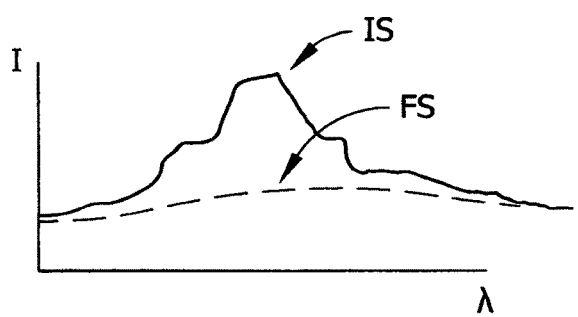
FIG. 3 demonstrates a wavelength spectrum made more uniform by application of the present invention.

FIG. 3 demonstrates a wavelength spectrum made more uniform by application of the present invention. Note an Initial Spectrum (IS) and a Final Spectrum (FS) after the present invention, in either of it's manifestations, is applied. It is also to be appreciated that the Initial Spectrum (IS) could easily saturate the CCD detector in the central regions, and diminishment of the entire Initial Spectrum (IS) might be necessary as a result. That would also diminish the lower intensity wavelengths intensities, which would be undesirable. However, a Final Spectrum (FS) could be increased in intensity across the board as shown in FIG. 4.

Figure 4:
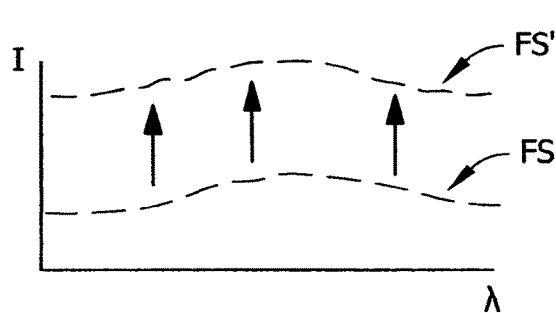
FIG. 4 demonstrates that in a more uniform wavelength spectrum low intensity wavelengths can be increased in intensity without saturating a detector in what were higher intensity wavelengths.

FIG. 4 demonstrates that in a more uniform wavelength spectrum (FS) low intensity valley region wavelengths can be increased in intensity without saturating a detector in what were higher intensity wavelengths. That is a beam of electromagnetic radiation originally having a FIG. 3 intensity profile shown as (IS), can be fashioned by application of the present invention to provide an intensity profile as shown in FIG. 4 as (FS'). Note that (FS') allows providing much higher intensity wavelengths in valley regions of the Initial intensity profile (IS), and that the higher intensity regions would not saturate a detector (FS') beam enters. Had the intensity demonstrated by "IS" in FIG. 3 been increased without application of the present invention, to increase the intensity of the lower intensity wavelengths, detector saturation would very likely occur in the mid-wave-length region. It is noted that the change from "FS" to FS' can be accomplished by electronic amplification, or by removal of neutral density filters that were already present.

It is noted that CCD's are used as a relevant example in this disclosure, but that any multi-element detector can be benefited by the present invention methodology and systems.

Figure 5:
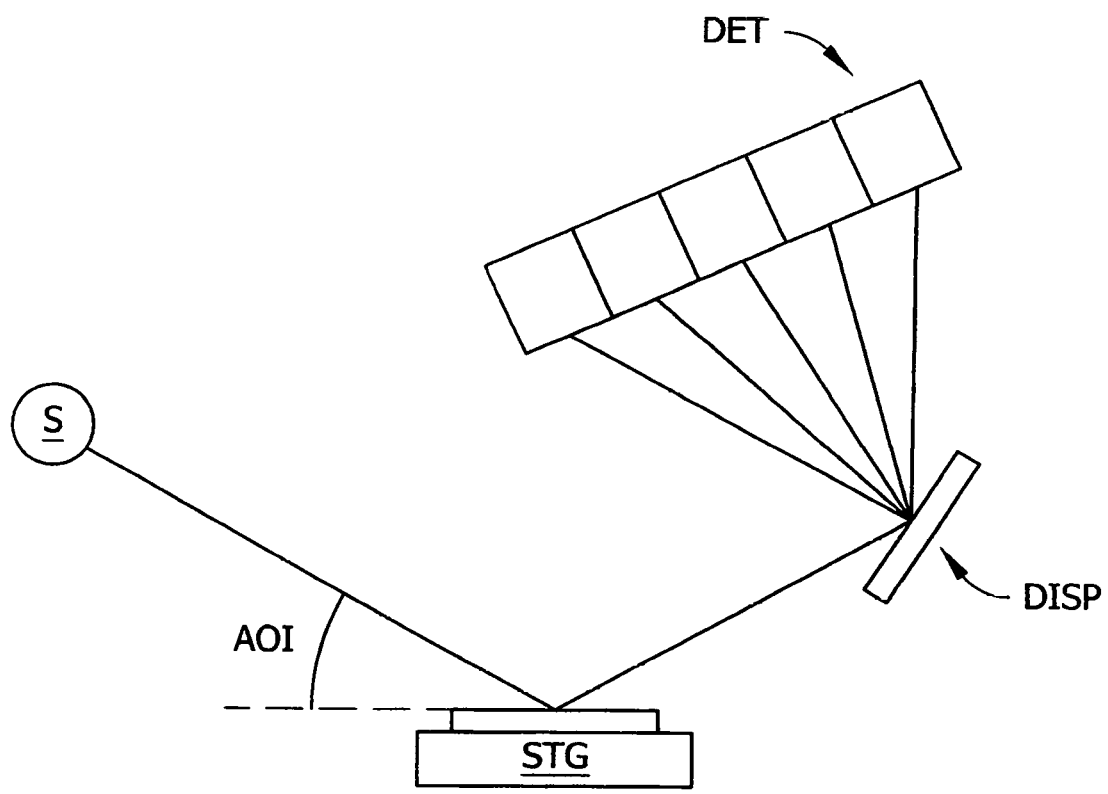
FIG. 5 demonstrates a Reflectometer, Spectrophotometer, Ellipsometer or Polarimeter.

FIG. 5 is included to demonstrate a basic Reflectometer, Spectrophotometer, Ellipsometer or Polarimeter, showing a Source (S) of a spectroscopic beam of electromagnetic radiation, a Stage (STG) for supporting a Sample (SAM), a Dispersion Element (DISP) and a Multi-Element Detector (DET). Note the indication of the Angle-of-Incidence (AOI) referred to in this Specification. The Plane-of-Incidence referred to herein, can be appreciated to be like the (AOI), but projected into and out of the page. In particular, when symmetric aperturing is applied as in FIG. 2b, the effective (AOI), and thus information content for that (AOI) is maintained. When this symmetry is not maintained, the information content in the signal that reaches the Detector (DET) in not maintained.

Finally, it is noted in FIG. 2b that the (WDM) shape is designed to provide a smaller effective "Aperture" in regions of the FIG. 3 high intensity (IS) wavelengths than in the valley regions to the right and left of the peak. That causes less high intensity wavelength electromagnetic radiation to pass therethrough. The effective "Aperture" area in the lower intensity valley regions, to the right and left of said peak, is larger so that more electromagnetic radiation can pass therethrough. Note also that the (WDM), as viewed frontal elevation, (FIG. 2b), is positioned symmetrically at both upper and lower locations, as viewed in frontal elevation, (eg. FIGS. 1b and 2b), so that the same average angle-of-incidence (AOI), (see FIG. 5), beam components continue to reach said detector elements, and therefore information content is maintained. This is an important consideration in the FIGS. 2a and 2b embodiment.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

We claim:

1. A system comprising a multi-element detector of electromagnetic radiation comprising a surface having non-uniform optical and/or physical properties, through which surface electromagnetic radiation passes to reach the multiple elements of said detector; wherein the surface at least two regions of non-uniform optical and/or physical properties form a wavelength dependent electromagnetic radiation aperture which is designed to attenuate high intensity wavelengths more than low intensity wavelengths, so that at least one wavelength of relatively higher intensity is subjected to greater aperturing, and thus a smaller area through which to pass, than is a relatively lower intensity wavelength and is therefore reduced in intensity more than is the relatively lower intensity wavelength, the result being a more uniform intensity beam of electromagnetic radiation entering said multi-element detector and a more uniform detector output, as a function of wavelength.

* * * * *